United States Patent [19]
Ueda

[11] Patent Number: 5,313,329
[45] Date of Patent: May 17, 1994

[54] LENS HOOD ASSEMBLY FOR ZOOM LENS

[75] Inventor: Toshiaki Ueda, Tokyo, Japan

[73] Assignee: Asahi Kogaku Kogyo Kabushiki Kaisha, Tokyo, Japan

[21] Appl. No.: 613,959

[22] Filed: Nov. 15, 1990

Related U.S. Application Data

[63] Continuation of Ser. No. 233,602, Aug. 18, 1988, abandoned.

[30] Foreign Application Priority Data

Aug. 21, 1987 [JP] Japan ................. 62-127091

[51] Int. Cl.⁵ .................................. G02B 15/00
[52] U.S. Cl. ......................... 359/676; 359/693;
     359/694; 359/696; 359/700; 359/701; 359/705
[58] Field of Search ............... 350/580, 429, 430;
     359/676, 694, 695, 696, 698, 683, 697, 699, 700,
     701, 703, 704, 705, 706

[56] References Cited

U.S. PATENT DOCUMENTS

| | | | |
|---|---|---|---|
| 4,002,402 | 1/1977 | Mito | 350/580 |
| 4,346,967 | 8/1982 | Komoto et al. | 350/430 |
| 4,472,032 | 9/1984 | Kamata et al. | 350/429 |
| 4,576,446 | 3/1986 | Kamata | 350/429 |
| 4,759,618 | 7/1988 | Kamata | 350/429 |
| 4,911,542 | 3/1990 | Nishio et al. | 350/255 |

FOREIGN PATENT DOCUMENTS

| | | | |
|---|---|---|---|
| 0033495 | 10/1971 | Japan | 350/580 |
| 0029821 | 3/1980 | Japan | 350/429 |
| 0077810 | 6/1981 | Japan | 350/580 |
| 0080011 | 7/1981 | Japan | 350/430 |
| 0114813 | 6/1985 | Japan | 350/430 |
| 0244026 | 10/1987 | Japan | 350/580 |

Primary Examiner—Bruce Y. Arnold
Assistant Examiner—R. D. Shafer
Attorney, Agent, or Firm—Sandler, Greenblum & Bernstein

[57] ABSTRACT

A lens hood assembly is provided for use with a zoom lens having a group of variable power lenses for varying focal length, the assembly comprising a lens hood which is adapted to be moved along the optical axis direction of the zoom lens and which is provided, on its front end, with an incident light restriction wall with a center opening through which incident light passes into the zoom lens, said lens hood being associated with the zooming operation of the zoom lens, wherein the lens hood is adapted to be moved forwardly and rearwardly at the long focal length and the short focal length of the zoom lens, respectively.

41 Claims, 10 Drawing Sheets

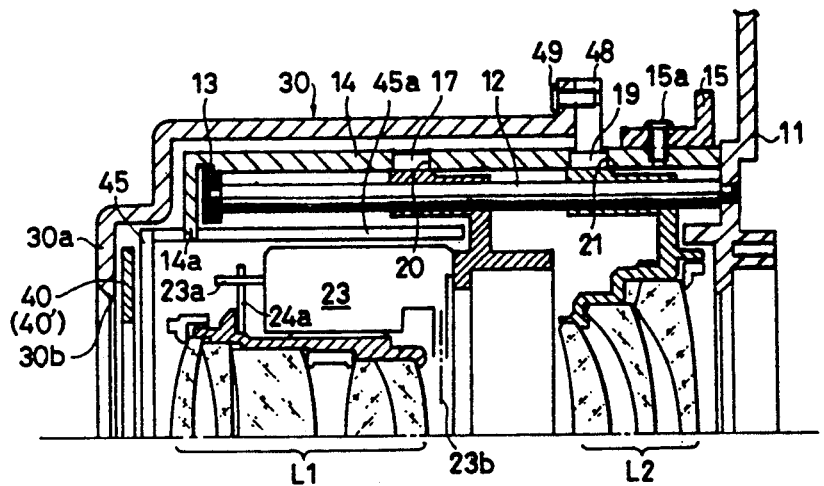
_Fig-11_
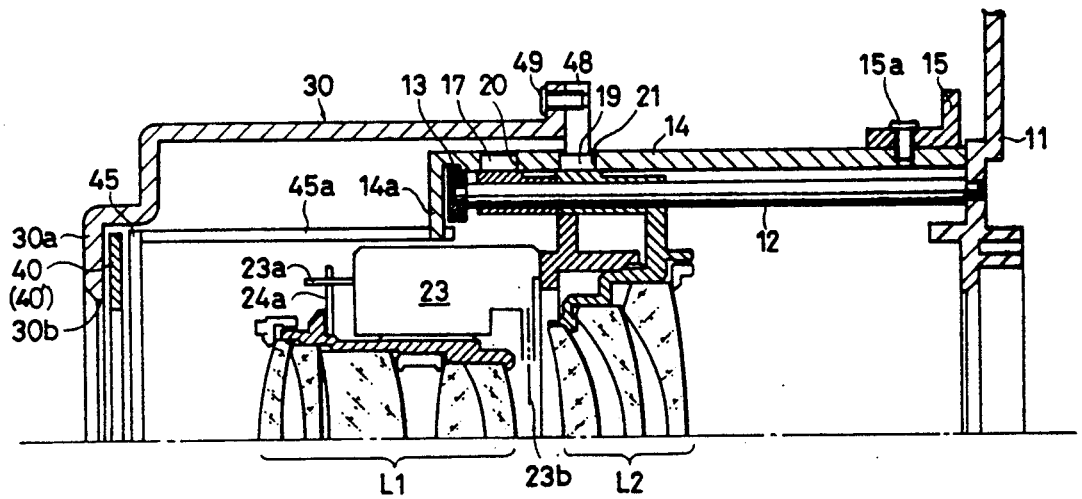
_Fig-12_ ic # LENS HOOD ASSEMBLY FOR ZOOM LENS

This application is a continuation of application Ser. No. 07/233,602, filed Aug. 18, 1988, now abandoned.

BACKGROUND OF THE INVENTION

1. Field of the Invention

The present invention relates to a lens hood for a zoom lens, and more precisely it relates to an incorporated lens hood assembly for properly restricting the incident light in accordance with the focal length (angle of view) of a camera.

2. Description of Related Art

A recent improvement in the quality of zoom lenses increases the number of users who use zoom lenses in place of a conventional fixed focus lens. A lens shutter type of camera having a zoom lens has been available on the market.

A lens hood is used to prevent light harmful to the formation of an image, e.g., sunlight located out of the angle of view, from being incident upon the lens during rear light photographing, so that no flare occurs. In a fixed focus lens, the occurrence of flare can be effectively prevented by a single length of hood without intercepting the effective light incident upon the lens.

However, in a zoom lens in which the angle of view (focal length) varies, such a single length lens hood can not effectively prevent the occurrence of flare. For instance, if the length of the lens hood is set to be an optimum value at a long focus range (telephoto side), the light which would otherwise be incident upon the peripheral portion of the angle of view is intercepted by the lens hood at a short focus range (wideangle side). On the contrary, if the length of the lens hood is set to be an optimum value at a short focus range (telephoto side), flare can not be effectively prevented by the lens hood at a long focus range.

SUMMARY OF THE INVENTION

The primary object of the present invention is therefore to provide a lens hood assembly which is incorporated in a zoom lens having a group of variable power lenses consisting of movable front and rear groups of lenses for varying the focal length (angle of view) and which can vary the angle of the light which can be incident upon the zoom lens in accordance with changes in the angle of view.

A lens hood according to one aspect of the present invention has an incident opening and an incident light control member on the periphery of the incident opening for restricting the incident opening. The lens hood is movable, both forwardly and rearwardly in the optical axis direction of the zoom lens, so that the lens hood is moved forwardly on the long focus side and is moved rearwardly on the short focus side in association with movement of the zoom lens for changing the magnification thereof. Preferably, the lens hood can be secured to the rear group of lenses of the group of variable power lenses, so that the angle of view can be automatically varied in accordance with the focal length.

The incident opening of the lens hood can be controlled to have an optimum size by a barrier consisting of a plurality of opening and closing barrier elements. The barrier can be supported, for example, by the incident light control member. The movable barrier elements move to restrict the incident light more precisely than does any restriction achieved by the incident opening of the lens hood.

The barrier can be used not only as a hood during a photographing operation, but also as a lens cover when the lens is accomodated. Namely, when the lens is moved to a retracted position in which the lens is accomodated, the incident opening of the lens hood is closed by the barrier, so that the lens hood and the lens cap can be constructed as a single barrier.

As an alternative, the barrier is provided on a radial wall portion of an annular member other than the lens hood. For example, a barrier frame can be provided integrally with the front group of lenses of the group of variable power lenses, so that the barrier can be supported on the barrier frame to restrict incident light more strictly than the restriction which is imposed by the incident opening of the lens hood in accordance with the focal length of the zoom lens.

Alternatively, it is also possible to provide a lens hood mechanism realized by the barrier, as mentioned above, without the provision of the lens hood. In this alternative, the incident opening and the incident opening control member on the periphery thereof are provided on an outermost annular frame with respect to a lens barrel, and the barrier is supported on the incident opening control member to restrict the incident light in accordance with the angle of view, and to close the incident opening when the lens is accomodated. In other words, the existing barrier which has been conventionally used only to close the incident opening in the accomodated position of the lens can also be used as a lens hood. The outermost annular frame can be a barrier frame secured, for example, to the front group of lenses.

BRIEF DESCRIPTION OF DRAWINGS

The invention will be described below in detail with reference to the accompanying drawings, in which:

FIG. 11 is a longitudinal sectional view of an upper half of an incorporated lens hood of a zoom lens, at its shortest focal length, according to still another aspect of the present invention;

FIG. 12 is a view similar to FIG. 11, but shown at a longest focal length;

DETAILED DESCRIPTION OF EMBODIMENTS

Figure 1:
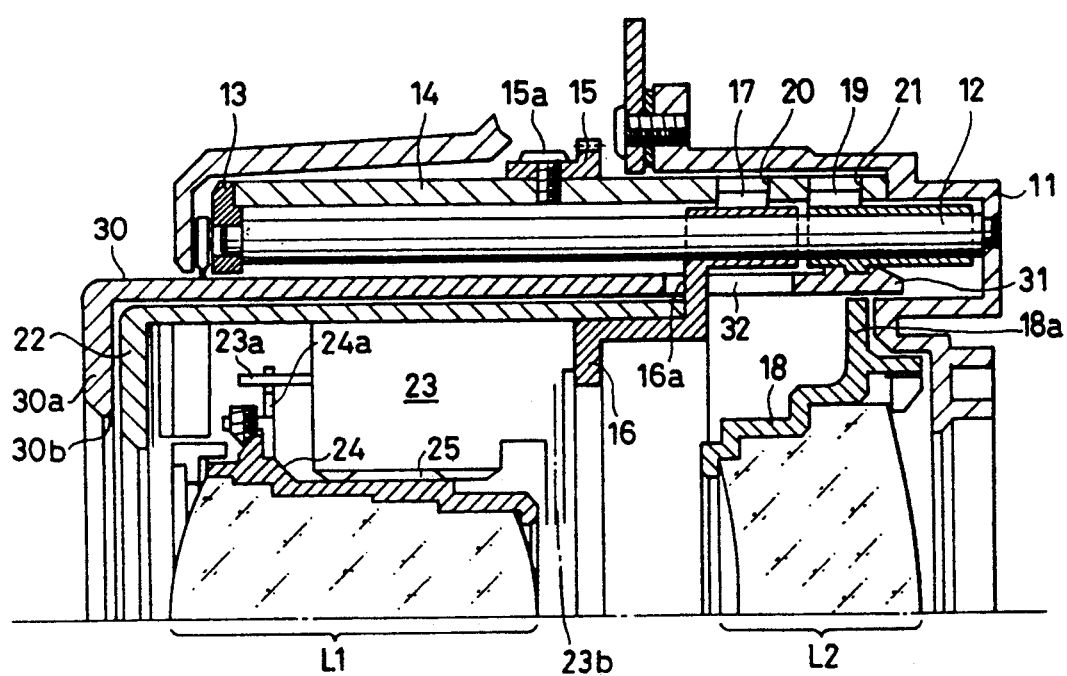
FIG. 1 is a longitudinal sectional view of an upper half of an incorporated lens hood of a zoom lens, according to one aspect of the present invention.

With specific reference to FIGS. 1 to 4, which show a zoom lens having a lens hood which moves in the optical axis direction in accordance with the focal length, the zoom lens, which has a macro-photographing function in addition to a zooming function, is driven by a zoom motor 5 provided in a camera body (not shown). A rear securing plate 11 is secured to the camera body. The rear securing plate 11 has four parallel guide rods 12 secured thereto, which are circumferentially located about a circle, and which extend in parallel with the optical axis. A front securing plate 13 is secured to the front ends of the guide rods 12. The elements mentioned above are main stationary elements of the zoom lens.

A cam ring 14 is rotatably supported between and by the rear and front securing plates 11 and 13. The cam ring 14 is provided, along its outer periphery, with a gear 15 which is secured thereto by set screws 15a and which is in mesh, directly or through a gear train (not shown), with a pinion 7 which is in turn secured to a drive shaft 5a of the zoom motor 5. The gear 15 is a sector gear which covers the angular displacement of the rotational movement of cam ring 14. Cam ring 14 has zooming cam grooves 20 and 21 for front and rear groups of lenses.

In the zooming cam grooves 20 and 21 are fitted rollers 17 and 19 for front and rear frames 16 and 18, respectively which are movably fitted onto the guide rods 12. The front frame 16 has a decorative frame 22 which is secured thereto by set screws 22a and a shutter block 23 secured to the front frame 16. A front lens frame 24 which supports a front group of lenses which will be referred to as a front lens group L1 is screw-engaged via the shutter block 23 by a helicoid 25, and has an arm 24a which is engaged by a lens feeding lever 23a of the shutter block 23, so that when the lens feeding lever 23a rotates in the circumferential direction to rotate the front lens frame 24 in the same direction, the front lens frame 24 is moved in the optical axis direction by the helicoid 25. A rear group of lenses which will be referred to as a rear lens group L2 is directly secured to the rear lens frame 18.

The shutter block 23, which is known per se, has a pulse motor (not shown) incorporated therein which rotates the lens feeding lever 23a by an angular displacement corresponding to an object distance which is measured by an object distance measuring device (not shown) having a light emitter and light receiver. Then, the shutter 23b (sector) which has been closed is opened for a predetermined period of time. After that, the shutter is closed again, and then the lens feeding lever 23a is returned to its initial position.

Between the decoration frame 22 and the guide rods 12, a cylindrical lens hood 30 is inserted which is generally in the form of a hollow cylinder and has at its front end an incident light restriction wall 30a with a center incident opening 30b. The lens hood 30 is provided, at its rear end, with an engaging member 31 which is fitted into and secured to a connecting leg 18a of the rear frame 18, by which the rear frame 18 is connected to one of the guide rods 12 so as to move together with the rear frame 18. The lens hood 30 has a window 32 through which a leg portion 16a of the front frame 16 which is connected to one of the guide rods 12 extends, so as to permit the front frame 16 and the lens hood 30 proper to move relative to each other.

The lens hood 30 of the invention operates as follows.

Figure 3:
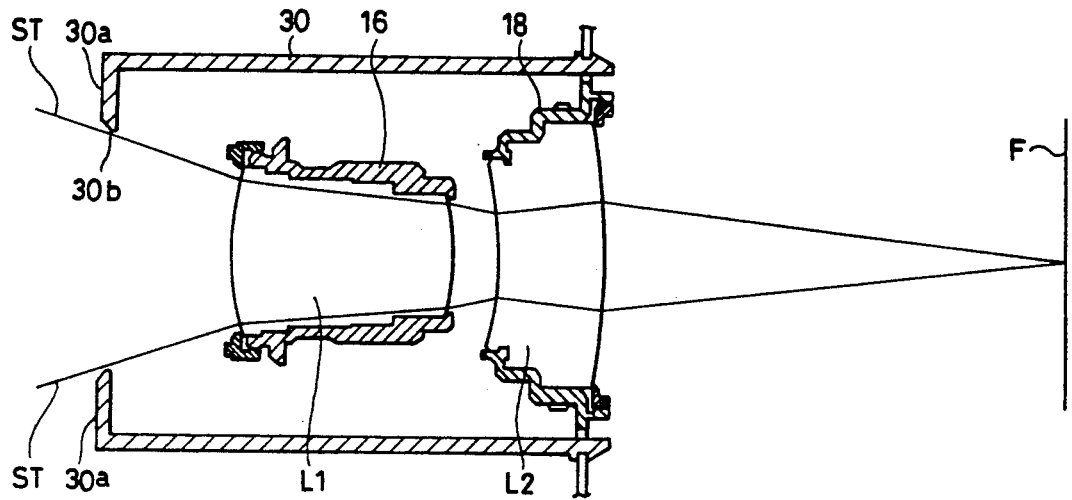
FIG. 3 is a schematic sectional view of a main part of the zoom lens of FIG. 1, at the longest focal length.
Figure 4:
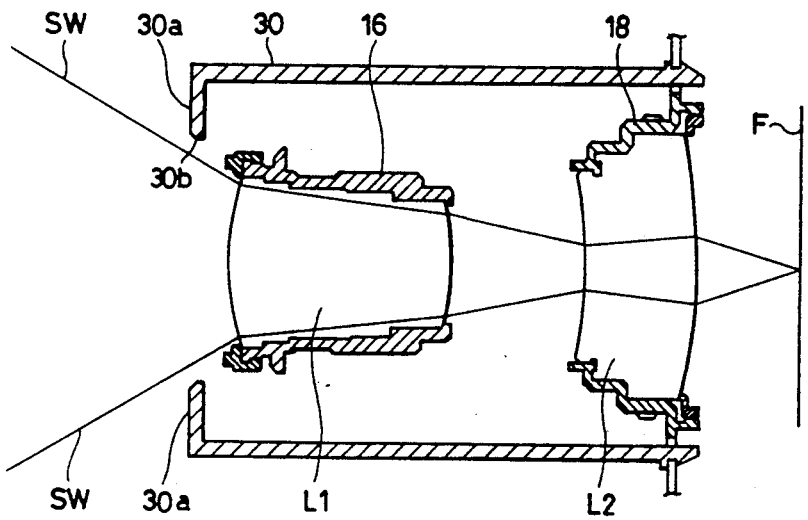
FIG. 4 is a schematic sectional view of a main part of the zoom lens of FIG. 1, at the shortest focal length.

FIGS. 3 and 4 shows the positional relationship between the lens hood 30 and the lens groups L1 and L2.

Specifically, when the zoom lens is in the longest focal length position (telephoto-extremity), as shown in FIG. 3, the rear lens group L2 and the lens hood 30 are located in the foremost position (furthest from the film F), and the front lens group L1 also occupies the forward position. The front lens group L1 is located closest to the rear lens group L2, and, accordingly, the incident light restriction wall 30a is furthest from the front lens group L1. The angle of view at the telephoto-extremity is defined by and in the light rays ST, ST which pass through the incident opening 30b of the incident light restriction wall 30a of the lens hood 30, in the vicinity of the circumferential edge of the center opening 30b, and which are effectively incident upon the front lens group L1. Namely, the lens hood 30 can effectively function. When the zooming operation toward the short focal length side (wide angle side) is effected, the front and rear lens groups L1 and L2 move rearwardly. It should be appreciated that the rearward displacement of the front lens group L1 is larger than that of the rear lens group L2. Therefore, when the zoom lens is located at the wide angle extremity, as shown in FIG. 4, the front lens group L1 and the rear lens group L2 are located in a rearwardmost position closest to the film F. The front lens group L1 is located far from the rear lens group L2 and closest to the incident light restriction wall 30a of the lens hood 30. In this position, the angle of view is defined by and in the light rays SW, SW which pass the center incident opening 30b of the lens hood 30 in the vicinity of the circumferential edge of the center opening 30b to be effectively incident upon the front lens group L1. Namely, the light rays SW, SW are not intercepted by the lens hood 30.

FIGS. 5 to 9 show another embodiment of a lens hood of the invention.

In this embodiment, the harmful light can be more effectively restricted by a movable barrier 80, in addition to restricting the harmful light by using the lens hood 30. In the first embodiment mentioned above, the lens hood 30 moves together with the rear frame 18 to control the incident angle in accordance with the focal length. In the first embodiment, it is, however, difficult to precisely restrict the incident angle throughout the focal lengths. For example, if the size (diameter) of the incident opening 30b of the lens hood 30 is set to be optimum at the wide angle side, the diameter of the incident opening 30b is larger than a desired optimum value at the telephoto side. To solve this problem, the incident opening is reduced in diameter by the movable barrier 80 according to the second embodiment. In the second embodiment, the movable barrier 80 also serves as a cap for closing the photographing opening, as will be described below.

Figure 2:
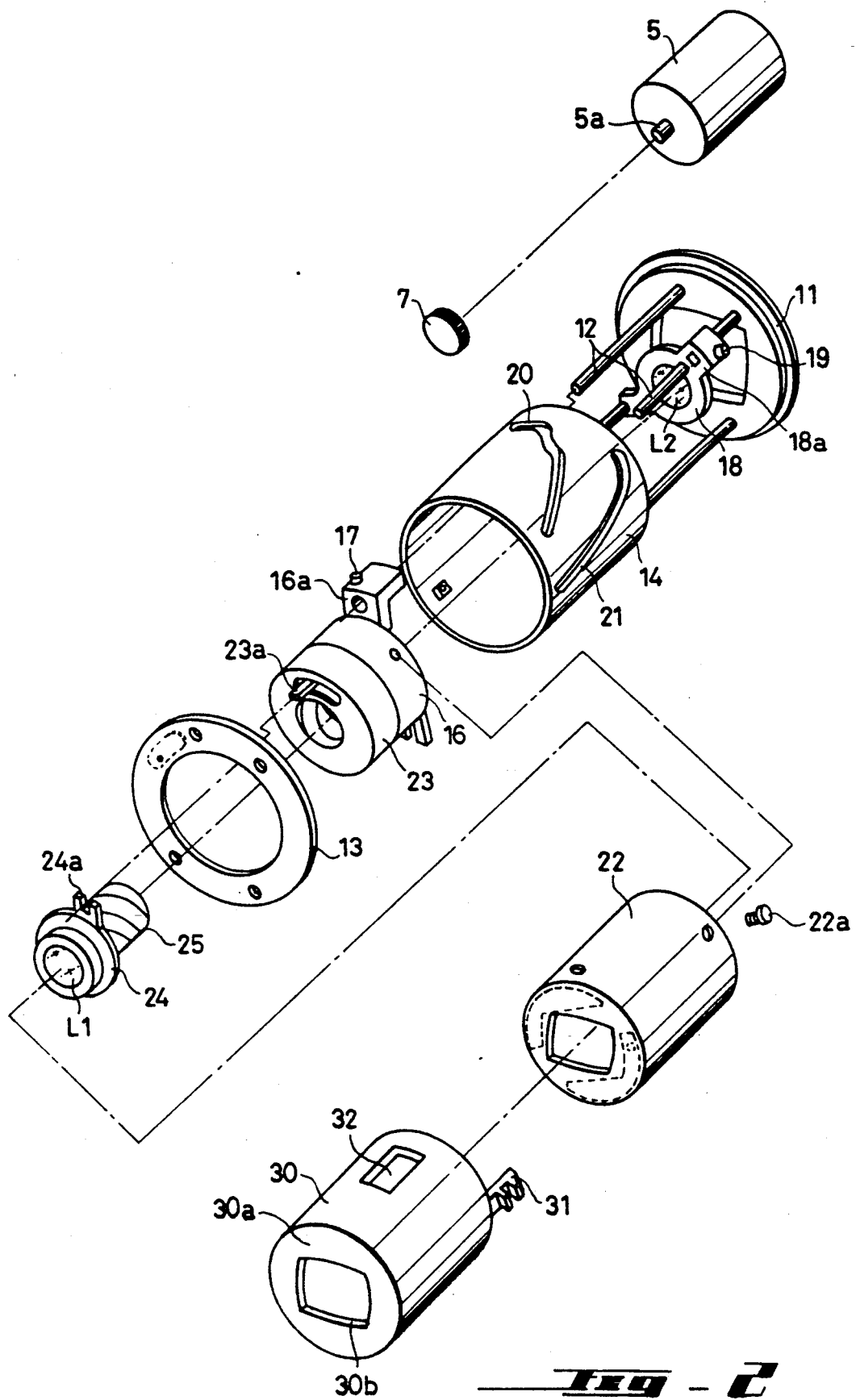
FIG. 2 is an exploded perspective view of the zoom lens shown in FIG. 1.
Figure 5:
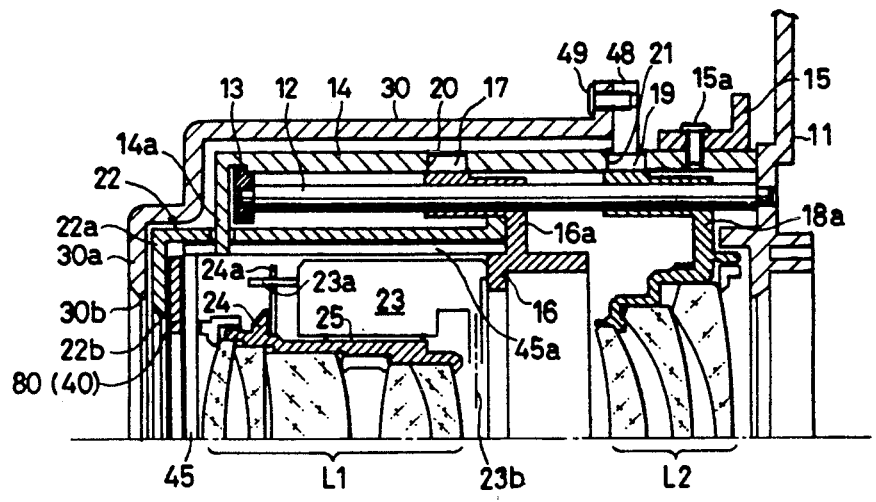
FIG. 5 is a longitudinal sectional view of an upper half of an incorporated lens hood of a zoom lens, at the longest focal length, according to another aspect of the present invention.
Figure 6:
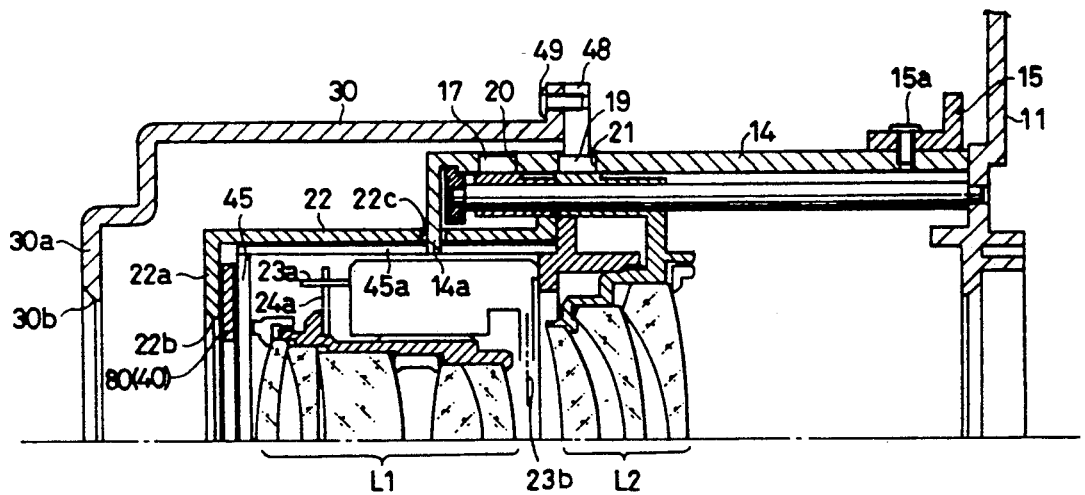
FIG. 6 is a longitudinal sectional view of an upper half of an incorporated lens hood of the zoom lens shown in FIG. 5, but at its shortest focal length.
Figure 7:
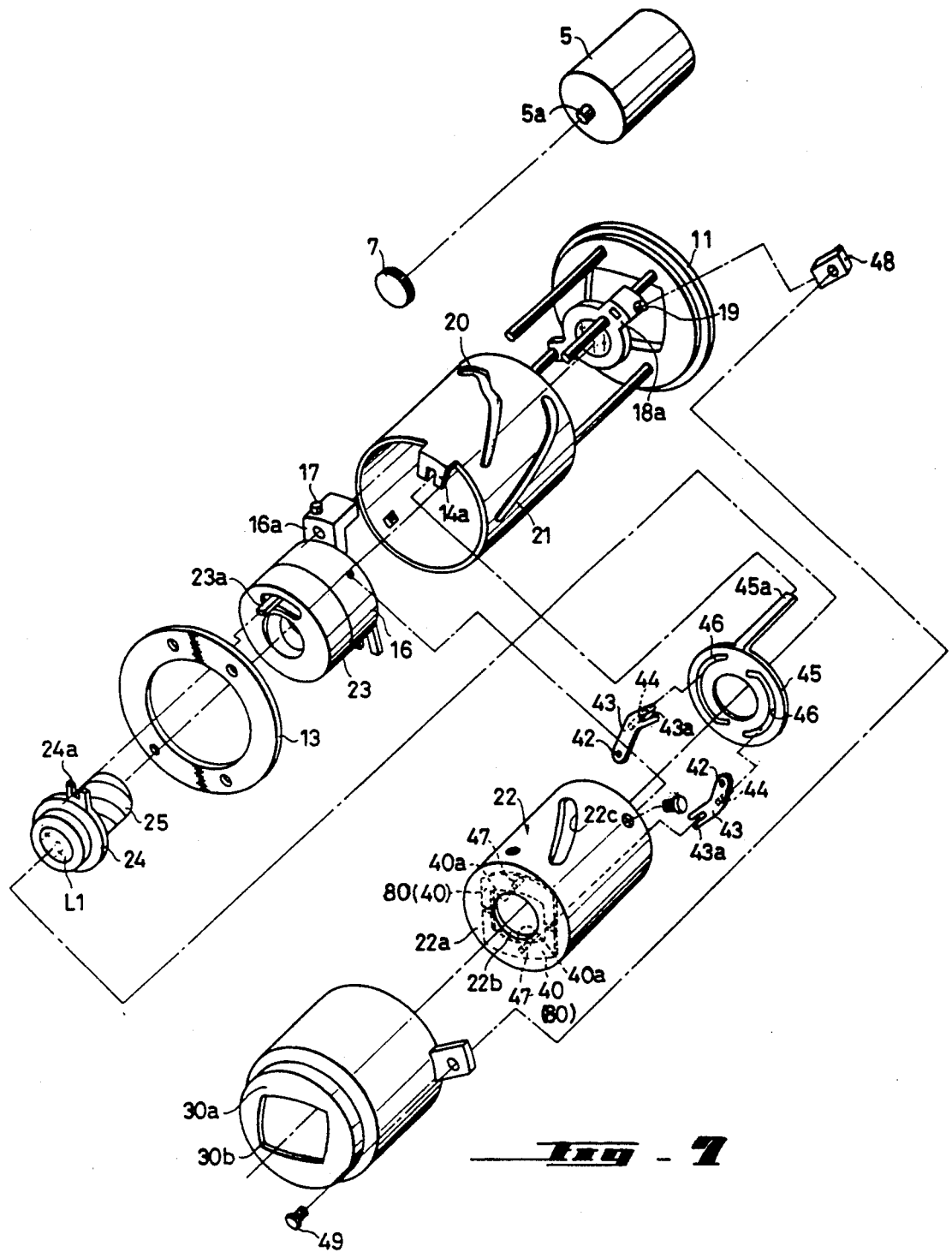
FIG. 7 is an exploded perspective view of FIG. 5.

The lens barrel shown in FIGS. 5 to 7 has a basic construction substantially identical to that of the embodiment shown in FIGS. 1 and 2. The elements corresponding to those in FIGS. 1 and 2 are designated by the same reference numerals.

Figure 9A:
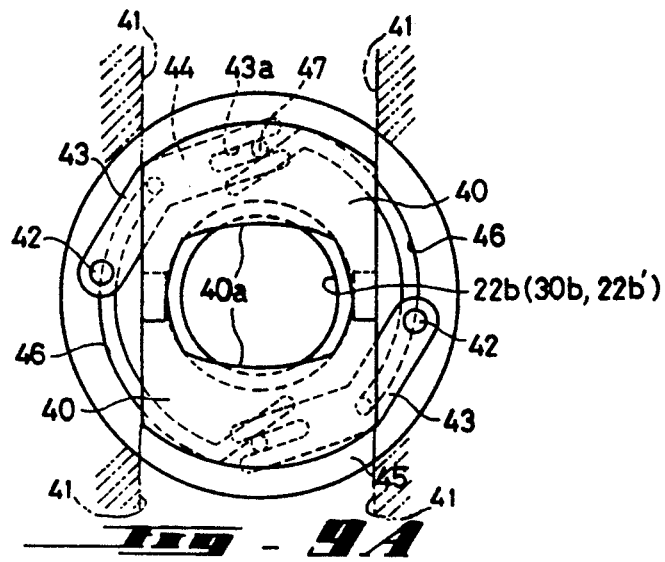
FIGS. 9A, 9B and 9C are front elevational views showing the operation of a zoom hood by a variable barrier, shown in different operational positions.
Figure 9B:
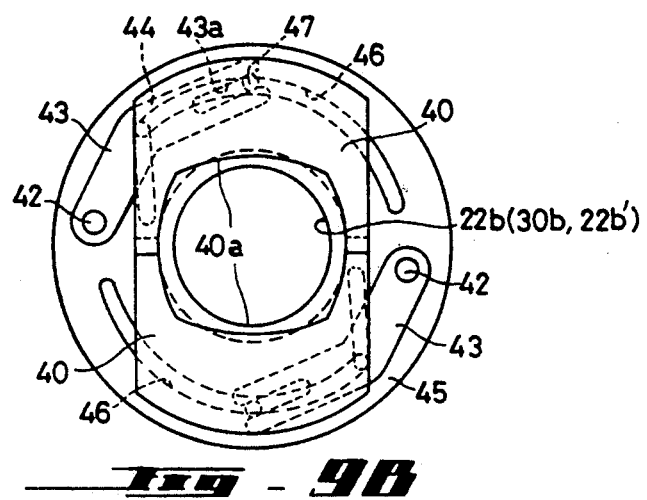
Figure 9C:
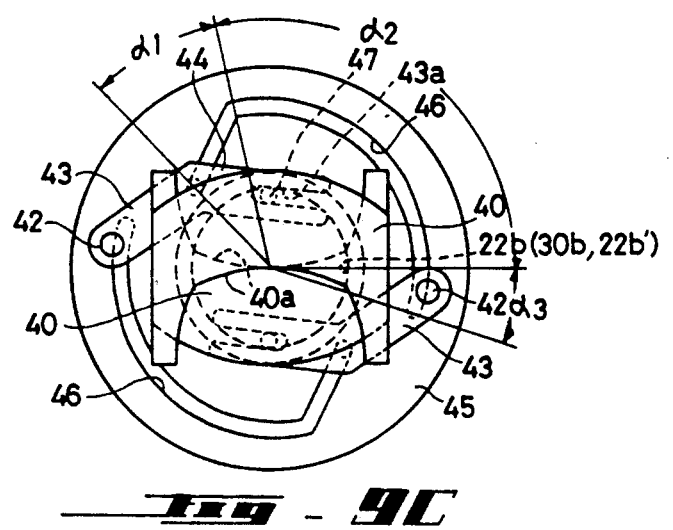

The barrier frame 22 has, at its front end, a radially projecting wall 22a with a center circular incident opening 22b. The barrier 80 has a pair of identical movable barrier elements 40 which have opposed inner archwise restriction surfaces 40a and which are supported by the wall 22a to linearly move along sliding guide surfaces 41 of the wall 22, so that the barrier elements 40 can occupy three positions, i.e., a partially closed position, as shown in FIG. 9A, in which the archwise restriction surfaces 40a of the barrier elements 40 partially close the incident opening 22b, an open position, as shown in FIG. 9B, in which the archwise restriction surfaces 40a of the barrier elements 40 completely open the incident opening 22b, and a completely closed position, as shown in FIG. 9C, in which the incident opening 22b is completely closed by the restriction surfaces 40a. In the completely closed position, the restriction surfaces 40a are brought into contact with each other at the center portions thereof in FIG. 9C.

A pair of opening and closing levers 43 are pivoted to the wall 22a of the barrier frame 22 through shafts 42, which are provided on the wall 22a. The opening and closing levers 43 have respective pins (associated pins) 44 provided thereon. The associated pins 44 are engaged in corresponding cam grooves 46 formed in a barrier opening and closing cam plate 45. Each of the levers 43 has bifurcated ends 43a in which pins 47 provided on the barrier elements 40 are engaged.

The barrier opening and closing cam plate 45, having a center bore, has a leg 45a which extends rearwardly in a direction parallel to the optical axis to be engaged in a bifurcated abutment 14a, which is formed by bending the cam ring 14, so that the barrier opening and closing cam plate 45 and the cam ring 14 always rotate together, regardless of the position (forward and rearward positions) of the barrier frame 22. The bifurcated abutment 14a projects into the barrier frame 22 through an elongated hole 22c formed in the barrier frame 22. In the illustrated embodiment, the lens hood 30 has a larger diameter than that of the cam ring 14, unlike the first mentioned embodiment. The lens hood 30 which is located outermost is secured to the rear lens frame 18 by attachment(s) 48 (FIG. 7) and machine screw(s) 49.

Figure 8:
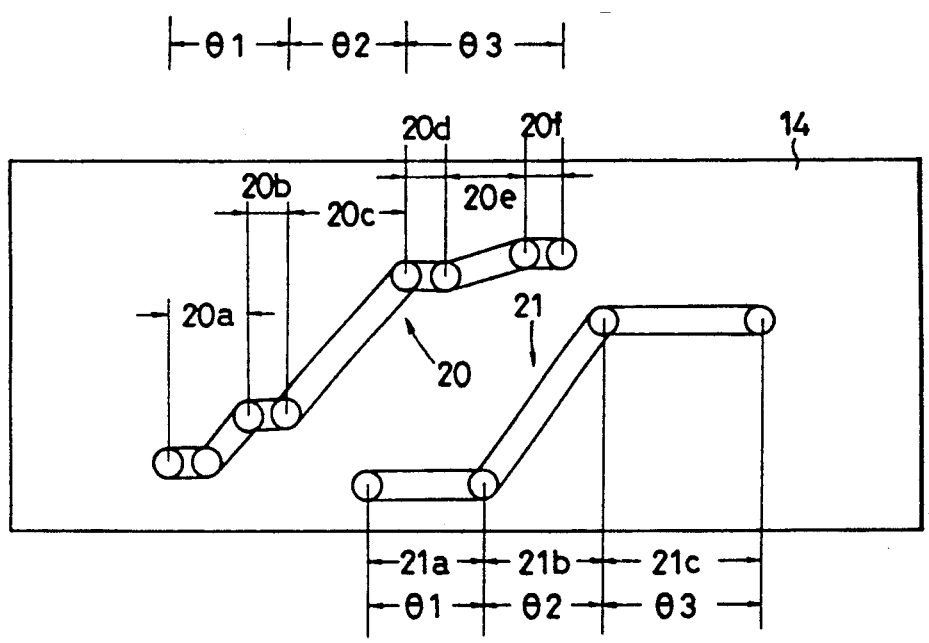
FIG. 8 is a developed view of cam grooves of a cam ring.

FIG. 8 shows a developed view of zooming cam grooves 20 and 21. The zooming cam groove 21 for the rear lens group includes a wide angle extremity fixing section 21a, a zooming section 21b and a telephoto extremity fixing section 21c. On the other hand, the zooming cam groove 22 for the front lens group moves the lenses to the lens accomodation position and includes a lens receiving barrier opening and closing section 20a for opening and closing the movable barrier elements 40, a wide angle extremity fixing section 20b, a magnification varying section 20c, a telephoto extremity fixing section 20d, a macro-feeding section 20e, and a macro extremity fixing section 20f. The angular displacement of these sections is as follows: namely, the total angle $\theta1$, of the lens receiving barrier opening and closing section 20a and the wide angle extremity fixing section 20b of the zooming cam groove 20, is identical to the angle $\theta1$ of the wide angle extremity fixing section 21a of the zooming cam groove 21; the angle $\theta2$ of the magnification varying section 20c is identical to the angle $\theta2$ of magnification varying section 21b ; and, the total angle $\theta3$ of the telephoto-extremity fixing section 20d, the macro-feeding section 20e, and the macro- extremity fixing section 20f is identical to the angle $\theta3$ of the telephoto extremity fixing section 21c.

The angles are associated with the angular displacement of the cam grooves 46 of the annular cam plate 45, which rotates together with the cam ring 14. Namely, each of the cam grooves 46 has a barrier opening and closing section $\alpha1$ having an angle corresponding to the angle of barrier opening and closing section 20a, a remaining zoom hood section $\alpha2$ and a macro section $\alpha3$. In the barrier opening and closing section $\alpha1$, the movable barrier elements 40 are moved from the completely closed position to the open position. In the zoom hood section $\alpha2$ and the macro section $\alpha3$, the movable barrier elements 40 are moved so that the opening defined by the opposed opening restriction surfaces 40a of the barrier elements 40 properly functions as a hood having an incident opening corresponding to the associated focal length.

The zoom lens as constructed above operates as follows.

When the cam ring 14 rotates, rotation is always transmitted to the barrier opening and closing cam plate 45 through the bifurcated abutment 14a and the leg 45a engaged therein. Since the associated pins 44 are engaged in the cam grooves 46 of the barrier opening and closing cam ring 45, the opening and closing levers 43 swing about the respective shafts 42 in accordance with the profile of the cam grooves 46. Consequently, swinging movement of the opening and closing levers 43 is converted to linear movement of the movable barrier elements 40, since the pins 47 provided on the movable barrier elements 40 are engaged in the bifurcated ends 43a of the opening and closing levers 43, and since the direction of the movement of the barrier elements 40 is restricted by the slide guide surfaces 41. As a result, the size of the incident opening defined by the restriction surfaces 40a of the movable barrier elements 40 varies in accordance with the profile of the cam grooves 46. Variation in the size of the incident opening referred to herein includes complete closure thereof. The portions of the cam grooves 46 that correspond to the barrier opening and closing sections $\alpha1$ have a relatively large inclination angle of cam profile for opening and closing the movable barriers 40, and the portions of the cam grooves 46 that correspond to the zoom hood section $\alpha2$ and the macro section $\alpha3$ have a smooth profile curve for slightly varying the movable barriers 40 so as to slightly vary the size of the incident opening defined by the restriction surfaces 40a in accordance with change in the focal length. In the illustrated embodiment, the restriction surfaces 40a project slightly radially inwardly from the inner periphery of the opening 22b to correct the large diameter of the opening defined by the incident opening 30b of the lens hood 30, to thereby provide a minimum size opening at the telephoto extremity, as shown in FIG. 9A. At the wide angle extremity, since a proper hood effect can be achieved by the incident opening 30b of the lens hood 30, the restriction surfaces 40a are completely retracted from the opening 22b to provide the largest size opening, as shown in FIG. 9B. Between the wide angle extremity and the telephoto extremity, restriction surfaces 40a can be placed in a desired position which can be determined by the profile of the cam grooves 46, between the open position and the completely closed position.

Figure 10A:
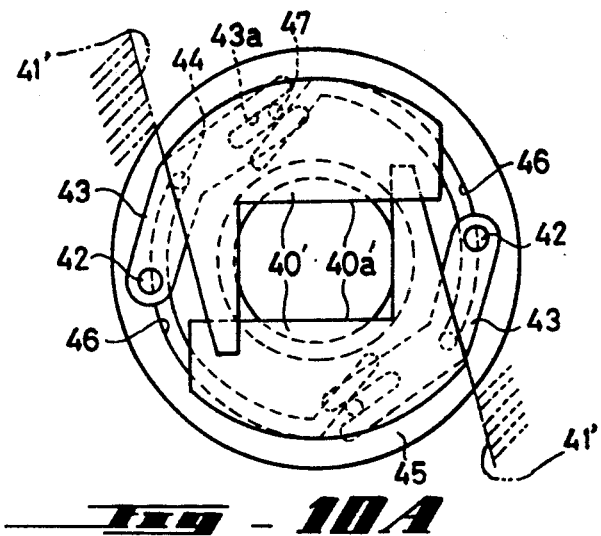
FIGS. 10A, 10B and 10C are views similar to FIGS. 9A, 9B and 9C, according to another aspect of the invention.
Figure 10B:
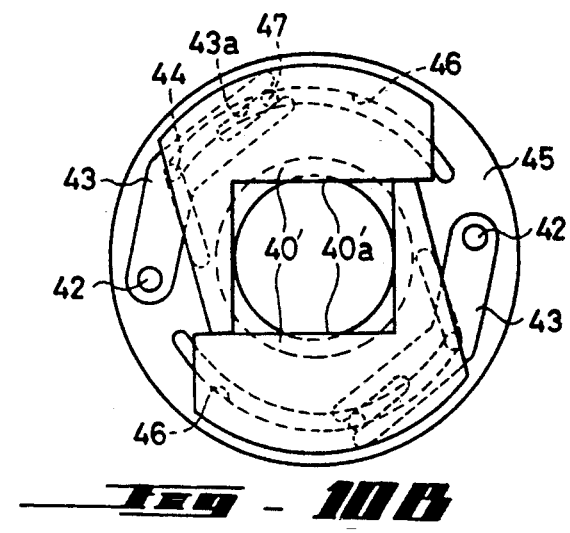
Figure 10C:
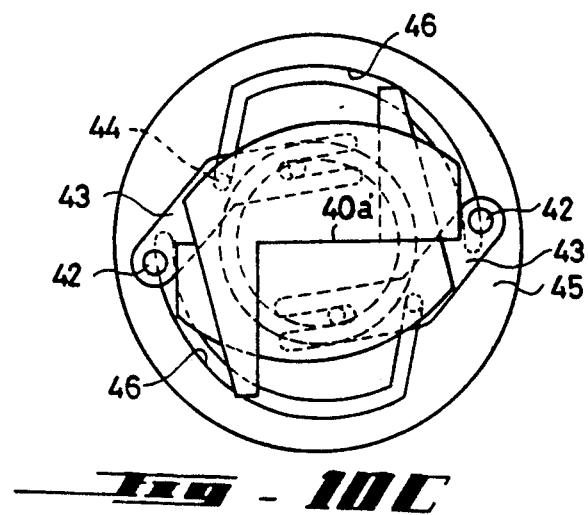

FIGS. 10A, 10B and 10C show another zoom hood mechanism which is different from the arrangement shown in FIGS. 9A, 9B and 9C, mainly in the following points. Namely, the shape of the movable barrier elements 40' is different from that of the movable barrier elements 40; the restriction surfaces 40a' are of linear shape, so that the opening 22b is completely closed when the opposed linear restriction surfaces 40a' are brought into contact with each other; and the direction of the slide guide surfaces 41' is different from that of the slide guide surfaces 41.

It is also possible to provide the barrier elements 40 or 40' directly on the lens hood 30 in place of the barrier frame 22c, as shown in FIGS. 11 and 12, in which are movable barrier elements 40 (or 40') are supported by the incident light restriction wall 30a of the lens hood 30. No barrier frame 22 is provided, so that the bifurcated abutment 14a of the cam ring 14 can be engaged by the leg 45a of the barrier opening and closing cam ring 45 without passing through the elongated hole 22c (FIG. 7). The mechanism for opening and closing the movable barrier elements 40 (or 40') is substantially identical to that of the arrangement shown in FIGS. 9A to 9C or 10A to 10C. Except for the fact that the incident opening 30b appears in place of the opening 22b, similar figures appear in the drawings. Other construction is substantially same as that of the embodiment shown in FIGS. 5 and 6. Elements corresponding to those in FIGS. 5 and 6 are designated with the same reference numerals.

Figure 13:
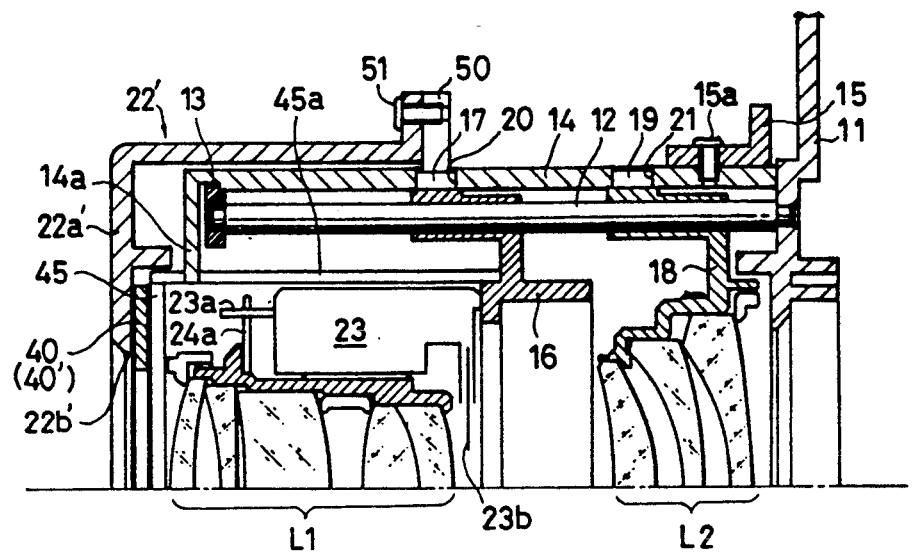
FIG. 13 is a longitudinal sectional view of an upper half of an incorporated lens hood of a zoom lens, at the shortest focal length, according to another aspect of the present invention; and, FIG. 14 is a view similar to FIG. 11, but shown at the longest focal length.
Figure 14:
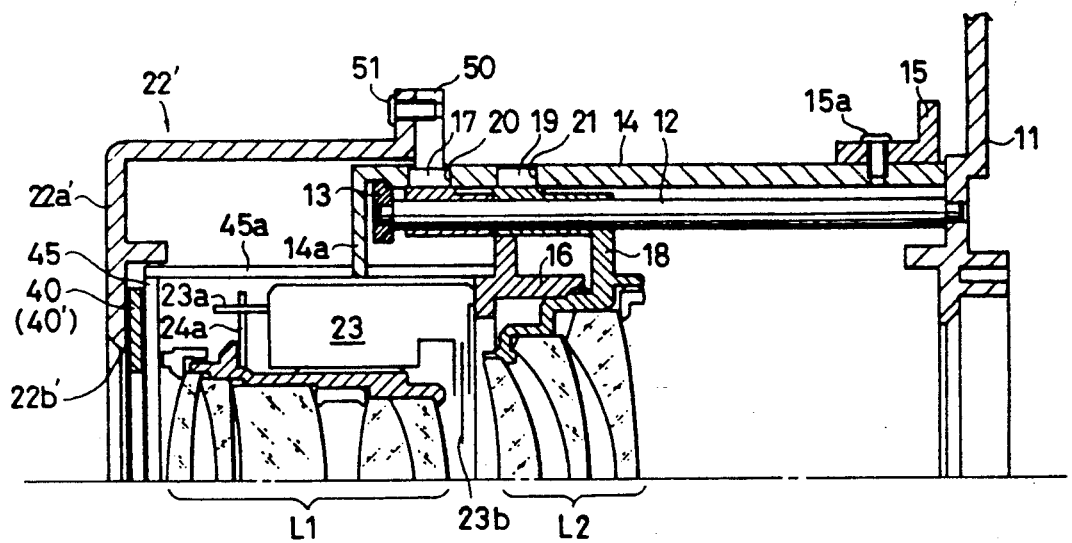

Alternatively, it is also possible to provide the zoom hood mechanism with the use of movable barrier elements 40 or 40' independently of lens hood 30. In FIGS. 13 and 14, no lens hood 30 is provided and the movable barrier elements 40 (or 40') are provided on the barrier frame 22'. In this alternative, barrier frame 22' is secured to the front frame 16 outside the cam ring 14 through the attachment(s) 50 and the machine screw(s) 51. Namely, the barrier frame 22' constitutes an outermost annular element. The movable barrier elements 40 (or 40') are supported on the incident light restriction wall 22a' of the barrier frame 22'. In a manner similar to the arrangement shown in FIGS. 11 and 12, the mechanism for opening and closing the movable barrier elements 40 (or 40') is substantially identical to that of FIGS. 9A to 9C or 10A to 10C, so that figures similar to FIGS. 9A to 9C or 10A to 10C appear in the drawings, except that the incident opening 22b' appears in place of the opening 22b. Other construction is substantially identical to the embodiment shown in FIGS. 5 and 6, or to that shown in FIGS. 11 and 12. The elements corresponding to those in FIGS. 5 and 6 or FIGS. 11 and 12 are designated with the corresponding reference numerals.

Note that since the track of the movement of the movable barrier can be optionally selected by the cam profile of the cam grooves 46 of the barrier opening and closing cam plate 45, the above-mentioned embodiments including the movable barrier can be easily applied to various zoom lenses having different focal length ranges.

It should be appreciated that the construction of the first embodiment mentioned above, which has no movable barrier, is simpler than that of the other embodiments which have the movable barrier, and, accordingly, can be advantageously incorporated in an electronic automatic camera.

I claim:

1. A lens assembly for a zoom lens having an optical axis and having a group of variable lenses for varying focal length, at least one lens of said group of lenses being movable in the optical axis direction of a zoom lens, said assembly comprising a lens hood which is movable in the optical axis direction of the zoom lens and which is provided with a center opening through which incident light passes through the zoom lens, said lens hood being secured for movement together with said movable one of said lenses, whereby the lens hood is moved forwardly at a long focal length of the zoom lens and is moved rearwardly at a short focal length of the zoom lens, said group of variable power lenses comprising at least front and rear groups of lenses which are moved forwardly at the long focal length of the zoom lens, so as to approach each other, and which are moved rearwardly at the short focal length of the zoom lens so as to distance themselves from each other, said rear group of lenses being provided with a rear lens frame for supporting said rear group of lenses, said lens hood being connected to the rear lens frame so as to move together with said rear lens frame, and a barrier frame integral with the front group of lenses, said barrier frame being provided, on a front end of said barrier frame, with an opening located inside the center opening of the lens hood and an inwardly and radially projecting restriction wall which defines said opening of said barrier frame, said barrier frame having a plurality of moveable barrier elements defining a restricted incident opening for incident light with respect to the center opening of the lens hood.

2. A lens hood assembly according to claim 1, further comprising a motor driven cam ring for moving the variable power lenses of the zoom lens.

3. A lens hood assembly according to claim 2, wherein said movable barrier elements cooperating with rotational movement of the cam ring, so that the incident opening defined by the movable barrier elements is made smallest at the longest focal length of the zoom lens and largest at the shortest focal length of the zoom lens.

4. A lens hood assembly according to claim 2, wherein said variable power lenses are movable into a lens accommodation position by the motor driven cam ring.

5. A lens hood assembly according to claim 4, wherein said movable barrier elements are movable to completely close the opening of the barrier frame at the lens accommodation position.

6. A lens hood assembly according to claim 1, wherein there are two movable barrier elements.

7. A lens hood assembly according to claim 6, wherein said two movable barrier elements are capable of linearly moving so as to move towards and away from each other.

8. A lens hood assembly according to claim 7, further comprising a barrier closing and opening cam plate integrally rotatable with a cam ring, for restricting the relative position of the movable barrier elements.

9. A lens hood assembly according to claim 8, further comprising a pair of opening and closing levers cooperating with the corresponding movable barrier elements, said levers having associated pins, wherein said barrier opening and closing cam plate has cam grooves in which said associated pins of the opening and closing levers are engaged, wherein rotation of the barrier opening and closing cam plate causes the movable barrier elements to approach and to move away from each other.

10. A lens hood assembly according to claim 9, wherein said lens hood is located inside of the cam ring.

11. A lens hood assembly according to claim 9, wherein said lens hood is located outside of the cam ring.

12. A lens hood assembly for a zoom lens having an optical axis and having a group of variable power lenses for varying focal length, at least one lens of said group of lenses being moveable in the optical axis direction of the zoom lens, said assembly comprising a lens hood which is moveable in the optical axis direction of the zoom lens and which is provided with a center opening through which incident light passes into the zoom lens, said lens hood being secured for movement together with said moveable one of said lenses, whereby the lens hood is moved forwardly at a long focal length of the zoom lens and is moved rearwardly at a short focal length of the zoom lens, a plurality of moveable barrier elements which are supported on an incident light restriction wall secured to an annular frame member of the zoom lens to define a restricted incident opening with respect to the center opening of the lens hood in accordance with the focal length of the zoom lens and a motor driven cam ring for moving the variable power lenses of the zoom lens.

13. A lens hood assembly according to claim 12, wherein said movable barrier elements cooperating with rotational movement of the cam ring, wherein the incident opening defined by the movable barrier elements is made smallest at the longest focal length of the zoom lens and is made largest at the shortest focal length of the zoom lens.

14. A lens hood assembly according to claim 13, wherein said variable power lenses are movable into a lens accommodation position by the motor driven cam ring.

15. A lens hood assembly according to claim 14, wherein said movable barrier elements are movable to completely close the opening of the barrier frame at the lens accommodation position.

16. A lens hood assembly according to claim 13, wherein there are two movable barrier elements.

17. A lens hood assembly according to claim 16, wherein said two movable barrier elements are capable of linearly moving so as to move towards and away from each other.

18. A lens hood assembly according to claim 17, further comprising a barrier closing and opening cam plate integrally rotatable with the dam ring for restricting the relative position of the movable barrier elements.

19. A lens hood assembly according to claim 18, further comprising a pair of opening and closing levers which are associated with the corresponding movable barrier elements, said levers having associated pins, wherein said barrier opening and closing cam plate has cam grooves in which said associated pins of the opening and closing levers are engaged, wherein rotation of the barrier opening and closing cam plate causes the movable barrier elements to move towards and away from each other.

20. A lens hood assembly for a zoom lens having a group of variable power lenses for varying the focal length and comprising an outermost annular frame member, wherein said outermost annular frame is provided, on a front end, with an incident opening through which incident light passes into a zoom lens, and an incident light restriction wall which defines the incident opening, said incident light restriction wall having a plurality of movable barrier members thereon, said incident light restriction wall restricting the incident opening in accordance with the focal length of the zoom lens, said movable barrier members mounted for a movement to open and close said incident opening.

21. A lens hood assembly according to claim 20, said group of variable power lenses comprising front and rear lens groups, and wherein said outermost annular frame member is a lens hood which is integral with the rear lens group of said variable power lenses.

22. A lens hood assembly according to claim 20, said group of variable power lenses comprising front and rear lens groups, and wherein said outermost annular frame member is a lens hood which is integral with the front lens group of said variable power lenses.

23. A lens hood assembly according to claim 20, further comprising a motor driven cam ring for moving the variable power lenses of the zoom lens.

24. A lens hood assembly for a zoom lens having a group of variable power lenses for varying the focal length and comprising an outermost annular frame member, wherein said outermost annular frame member is provided, on a front end, with an incident opening through which incident light passes into a zoom lens, and an incident light restriction wall which defines the incident opening, said incident light restriction wall having a plurality of movable barrier elements thereon, said incident light restriction wall restricting the incident opening in accordance with the focal length of the zoom lens, said group of variable lenses comprising at least front and rear groups of lenses which are moved forwardly at a long focal length of the zoom lens so as to approach each other and are moved rearwardly at a short focal length so as to space themselves from each other, said movable barrier elements are associated with rotational movement of a cam ring, wherein the incident opening defined by the movable barrier elements is made smallest at the longest focal length of the zoom lens and is made largest at the shortest focal length of the zoom lens.

25. A lens hood assembly according to claim 24, wherein said variable power lenses are movable into a lens accomodation position by the motor driven cam ring.

26. A lens hood assembly according to claim 25, wherein said movable barrier elements are movable to completely close the incident opening of the outermost annular frame member at the lens accomodation position.

27. A lens hood assembly for a zoom lens having a group of variable power lenses for varying the focal length and comprising an outermost annular frame member, wherein said outermost annular frame member is provided, on a front end, with an incident opening through which incident light passes into a zoom lens, and an incident light restriction wall having a plurality of movable barrier elements thereon, said incident light restriction wall restricting the incident opening in accordance with the focal length of the zoom lens, said group of variable power lenses comprising at least front and rear groups of lenses which are moved forwardly at a long focal length of the zoom lens so as to approach each other and are moved rearwardly at a short focal length so as to space themselves from each other, there being two movable barrier elements, said two movable barrier elements being capable of linearly moving so as to move towards and away from each other, and a barrier closing and opening cam plate integrally rotate with a cam ring, for restricting the relative position of the movable barrier elements.

28. A lens hood assembly according to claim 27, further comprising a pair of opening and closing levers which are associated with the corresponding movable barrier elements, said levers having associated pins, wherein said barrier opening and closing cam plate has cam grooves in which said associated pins of the opening and closing levers are engaged, wherein rotation of the barrier opening and closing cam plate causes the movable barrier elements to come close to and away from each other.

29. A lens hood assembly for a zoom lens having an optical axis and having a group of variable power lenses for varying focal length, at least one lens of said group of lenses being movable in the optical axis direction of a zoom lens, said assembly comprising a lens hood which is movable in the optical axis direction of the zoom lens and which is provided with a center opening through which incident light passes into the zoom lens, said lens hood being secured for movement together with said movable one of said lenses, whereby the lens hood is moved forwardly at a long focal length of the zoom lens and is moved rearwardly at a short focal length of the zoom lens, an incident light restricting wall having a central opening is provided on the front end of said lens hood, in front of a focusing lens of the zoom lens, said wall comprising means allowing incident light to pass into the zoom lens through said central opening.

30. A lens hood assembly for a zoom lens according to claim 29, the zoom lens further comprising a lens barrel.

31. A lens hood assembly for a zoom lens according to claim 30, said lens hood being positioned externally of said lens barrel.

32. The lens hood assembly for a zoom lens according to claim 29, wherein said group of variable power lenses are received within an annular sleeve for movement with said annular sleeve in the direction of the optical axis.

33. The lens hood assembly for a zoom lens according to claim 29, wherein said lens hood is movable with respect to the frontmost one of the said lenses, in the direction of the optical axis.

34. The lens hood assembly for a zoom lens according to claim 29, said lens hood being positioned forwardly of all lenses of the zoom lens.

35. The lens hood assembly for a zoom lens according to claim 29, said lens hood comprising an annular member extending from the one of said lenses to which said hood is secured, beyond a front most optical element of the zoom lens, said incident light restricting wall positioned at a frontmost extremity of said annular member and extending transverse to said annular member.

36. A lens hood assembly for a zoom lens having a group of variable power lenses for varying focal length, at least one lens of said group of lenses being movable in the optical axis direction of a zoom lens, said assembly comprising a lens hood which is movable in the optical axis direction of the zoom lens and which is provided on the front end of said lens hood with an incident light restriction wall, said wall including a central opening comprising means allowing incident light to pass into the zoom lens, said lens hood being associated with the zooming operation of the zoom lens whereby the lens hood is moved forwardly at a long focal length of the zoom lens and is moved rearwardly at a short focal length of the zoom lens, said incident light restriction wall being positioned in front of a focusing lens of the zoom lens.

37. The lens hood assembly for a zoom lens according to claim 36, the zoom lens further comprising a lens barrel.

38. The lens hood assembly for a zoom lens according to claim 37, said lens hood being positioned externally of said lens barrel.

39. The lens hood assembly according to claim 36 wherein said lens hood is secured for movement with the movable one of said lenses.

40. The lens hood assembly for a zoom lens according to claim 36, wherein said at least one lens of said group of lenses is received within a lens frame for movement with said lens frame in the direction of the optical axis.

41. The lens hood assembly for a zoom lens according to claim 36, said lens hood being positioned forwardly of all lenses of the zoom lens.

* * * * *

UNITED STATES PATENT AND TRADEMARK OFFICE
CERTIFICATE OF CORRECTION

PATENT NO. : 5,313,329
DATED : May 17, 1994
INVENTOR(S) : Toshiaki UEDA

It is certified that error appears in the above-indentified patent and that said Letters Patent is hereby corrected as shown below:

At column 7, line 67 (claim 1, line 2) of the printed patent, change "variable lenses" to ---variable power lenses---.

At column 8, line 26 (claim 1, line 29) of the printed patent, insert ---supported on said restriction wall, said movable barrier elements--- after "elements".

At column 9, line 47 (claim 18, line 3 ) of the printed patent, change "dam" to ---cam---.

At column 10, line 68 (claim 27, line 19) of the printed patent, change "rotate" to ---rotatable---.

At column 11, line 32 (claim 30, line 1) of the printed patent, change "A" to ---The---.

At column 11, line 35 (claim 31, line 1) of the printed patent, change "A" to ---The---.

Signed and Sealed this

Twenty-second Day of August, 1995

Attest:

*Attesting Officer*

BRUCE LEHMAN

*Commissioner of Patents and Trademarks*